May 19, 1964   E. F. JOHNSON   3,133,332
PHOTOGRAPHIC SLIDE CARTRIDGE
Filed Nov. 6, 1962
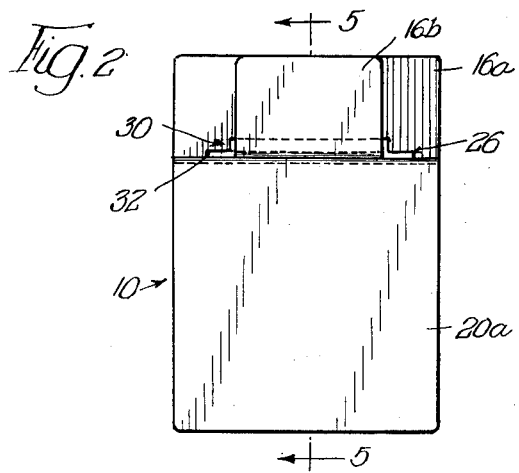
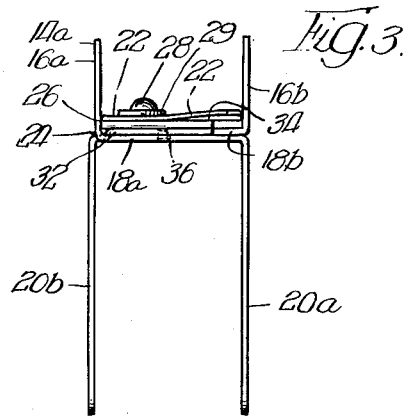
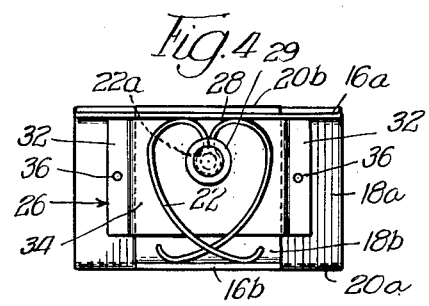
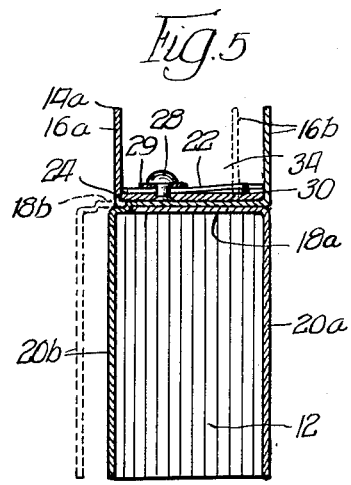
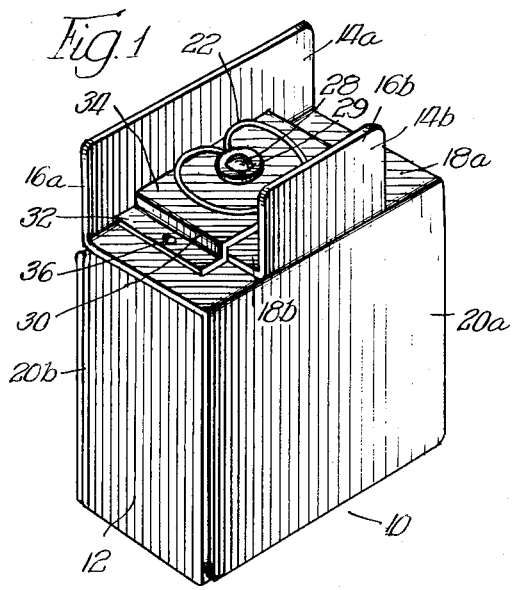
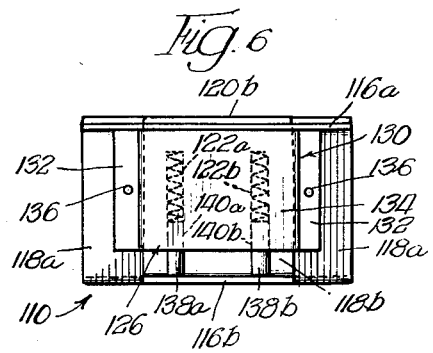
INVENTOR.
Edward F Johnson,
BY
Byron, Hume, Groen + Clement
attys.

United States Patent Office 3,133,332
Patented May 19, 1964

3,133,332
PHOTOGRAPHIC SLIDE CARTRIDGE
Edward F. Johnson, 2740 E. Wilson Ave., Orange, Calif.
Filed Nov. 6, 1962, Ser. No. 235,717
4 Claims. (Cl. 24—263)

The present invention relates to a device for use with photographic slides or transparencies and, more specifically, to a cartridge for holding photographic slides or transparencies.

It is an object of the present invention to provide a new and improved photographic slide cartridge adapted to hold and store photographic slides or transparencies.

It is another object of the present invention to provide a photographic slide cartridge that is compact, easy to grasp, and simple to operate.

It is a further object of the present invention to provide a photographic slide cartridge that normally stores photographic slides, yet is actuable to release the stored slides into a slide feeding mechanism, for example.

It is another object of the present invention to provide a photographic slide cartridge having its frame members resiliently biased to resiliently store photographic slides.

It is a still a further object, in accordance with the previous objects, to provide a photographic slide cartridge that releases the stored slides by the simple expedient of applying finger pressure.

It is yet another object of the present invention to provide a photograph slide cartridge that is susceptible to mass production techniques and, thus, may be produced relatively quickly and inexpensively.

The above and other objects of the present invention are realized by providing a new and improved photographic slide cartridge adapted to hold and release photographic slides or transparencies. In its preferred embodiment the cartridge comprises relatively movable frame members, each of which includes a finger gripping leg, an intermediate leg, and a slide gripping leg. The frame members are slidable and are arranged such that their intermediate legs are superimposed. A suitable plate means is secured to one of said intermediate members to guide the other intermediate member during movement in relation to the first intermediate member. Additionally, biasing means are supported from the plate means to resiliently urge the slide gripping legs together.

The invention, both as to its organization and method of operation taken with further objects and advantages thereof, will best be understood by reference to the following description taken in connection with the accompanying drawing, in which:

FIGURE 1 is a perspective view of one embodiment of a photographic slide cartridge embodying the features of the present invention;

FIGURE 2 is a front elevational view of the cartridge of FIGURE 1;

FIGURE 3 is a side elevational view of the cartridge of FIGURE 1;

FIGURE 4 is a top plan view of the cartridge of FIGURE 1;

FIGURE 5 is a side elevational view of the cartridge of FIGURE 1, the relative position of the frame members after actuation being illustrated in phantom; and FIGURE 6 is a top plan view of another embodiment of the photographic slide cartridge embodying the features of the present invention.

Referring now to the drawings and more particularly to FIGURE 1, wherein like reference numerals designate like parts, a cartridge embodying the features of the present invention is illustrated and identified generally by the reference numeral 10. The cartridge 10 is particularly adapted to store or hold graphic slides or transparencies 12. In addition, the cartridge 10 is manually actuable to discharge by gravity the stored slides 12 into a suitable receiving mechanism, for example a slide feeding mechanism in a slide projector (not shown).

The slides 12 are held in the cartridge 10 by slide gripping legs 20 of step-shaped frame members 14. Finger gripping legs 16 are resiliently biased apart by a flat wire spring 22 which also urges the slide gripping legs 20 together. Accordingly, when the slides 12 are placed between the slide gripping legs 20, they will be resiliently gripped and stored. To release the slides 12 from the legs 20, the finger gripping legs 16 are squeezed by the operator's fingers to compress the spring 22 and cause the slide gripping legs 20 to separate. As a result, the legs 20 release their grip on the slides 12 which fall by the force of gravity into a suitable slide feeding mechanism in a slide projector.

Considering the photographic slide cartridge 10 generally, it comprises a first step-shaped frame member 14a and a second step-shaped frame member 14b. Each frame member 14a and 14b is comprised of a finger gripping leg 16a and 16b, an intermediate leg 18a and 18b, and a slide gripping leg 20a and 20b. The first frame member 14a has a slot 24 disposed intermediate the vertical edges of the finger gripping leg 16a at its juncture with the intermediate leg 18a. This slot 24 accommodates the intermediate leg 18b of the second stepped member 14b, such that the intermediate legs 18a and 18b are overlapped and the resultant cartridge 10 will have a generally H-shaped side configuration.

The frame members 14a and 14b are relatively movable by means of finger gripping legs 16a and 16b, which are relatively biased by a generally heart-shaped flat wire spring 22 fixedly secured to a bracket 26 appropriately fastened to the first intermediate leg 18a. As best illustrated in FIGURE 3, this spring 22 is normally in a depressed condition between the finger gripping leg 16a and 16b and thus exerts a force on the frame members 14a and 14b so as to maintain them in the position illustrated in FIGURE 3. When the finger gripping legs 16a and 16b are squeezed together against the force of the spring 22, the intermediate legs 18a and 18b slide relative to one another and the slide gripping legs 20 move from the position illustrated in solid lines in FIGURE 5 to the position illustrated in phantom in FIGURE 5. As a result, the slide gripping legs 20 are separated, and any slides 12 stored between the legs 20 are released. When the finger gripping legs 16a and 16b are released, the spring 22 urges the legs 16a and 16b back to their normal positions, with the result that the intermediate legs 18a and 18b slide relative to one another in a direction opposite to that described above and the slide gripping legs 20a and 20b move toward one another into the position illustrated in solid lines in FIGURE 5.

The step-shaped frame members 14a and 14b have a configuration best shown in FIGURES 1, 2, and 4 and 5 include, respectively, vertical finger gripping legs 16a and 16b, intermediate legs 18a and 18b horizontally disposed at one end of the finger gripping legs 16a and 16b, and slide gripping legs 20a and 20b vertically disposed in a downward direction at the other end of the intermediate legs 18a and 18b.

The first frame member 14a has legs 16a, 18a, and 20a which are all of the same width, but the width of the legs 16b, 18b and 20b of the second frame member 14b are not the same. The second slide gripping leg 20b is the same width as its counterpart, the first slide gripping leg 20a, whereas, the intermediate leg 18b and the finger gripping leg 16b are approximately one-half the width of any of the other legs 16a, 18a, 20a, and 20b.

The first frame member 14a has an aperture in the form of a narrow slot 24 cut horizontally in the finger gripping leg 16a for a distance of approximately one-half its width. Actually, the slot 24 is disposed at the base of the vertical edge of the finger gripping leg 16a, immediately adjacent the intermediate leg 18a. In assembly, the finger gripping leg 16b and intermediate leg 18b of the second frame member 14b are passed through this slot 24 and positioned so that both the intermediate legs 18a and 18b overlap, the first intermediate leg 18a being disposed beneath the second intermediate leg 18b to form an assembly with a generally H-shaped end configuration.

The intermediate leg 18b and slide gripping leg 20b of the second frame member 14b are offset from one another at their juncture as best seen in FIGURE 5. This offset prevents the possibility of the slides 12 moving up in the gap between the second slide gripping leg 20b and the first intermediate leg 18a when the cartridge 10 is manually actuated and thus preventing the second slide gripping leg 20b from springing back completely when the manual actuation is stopped or released.

The generally heart-shaped flat wire spring 22 is fixedly secured to the bracket 26 by means of a countersunk head rivet 28 which passes through a washer 29 and a bulbous portion 22a of the spring 22 into the bracket 26. The washer 29 insures that the spring 22 will remain fixedly secured to the bracket 26 by preventing the bulbous spring portion 22a from working free of the rivet 28.

The bracket 26 in turn is secured to the first intermediate leg 18a by means of fasteners 36 passing through and securing the outermost end portions 32 thereto. The bracket 26 comprises a plate having both end portions thereof formed into L-shaped configurations 30 such that when the bracket 26 is seated on the first intermediate leg 18a, the outermost end portions 32 thereof are contiguous with the first intermediate leg 18a. Actually, the center portion 34 is slightly wider than the second intermediate leg 18b to provide a passage or guiding means for the second intermediate leg 18b during its movement relative to leg 18a when the cartridge 10 is actuated.

The generally heart-shaped flat wire spring 22 as best shown in FIGURES 1 and 4, is located between, and coacts with, the finger gripping legs 16a and 16b. When in the position illustrated by the phantom lines in FIGURE 5, the spring 22 is depressed and exerts a force on the finger gripping legs 16a and 16b. Because the spring 22 is fixedly secured to the first stepped member 14a, its position is correspondingly fixed with respect to the first finger gripping leg 16a and the force exerted by the spring 22 is directed against the second finger gripping leg 16b to cause it to be pushed or forced away from its corresponding leg 16a. The separating movement of the leg 16b is limited, however, by the engagement of the second slide gripping leg 20 with the first intermediate leg 18a. The finger gripping legs 16a and 16b are maintained in assembled relation, yet are resiliently biased apart under the control of the spring 22. The slide gripping legs 20a and 20b are maintained in assembled relation, but conversely, are resiliently biased together under the control of the spring 22.

Thus, the bracket 26 serves to support the spring 22, guide the passage of the second intermediate leg 18b when the cartridge 10 is actuated, maintain the frame members 14a and 14b in assembled relation with assistance from the spring 22, and maintains the intermediate legs 18a and 18b in superimposed relation. In addition, as will be seen later in more detail, the bracket 26 serves to limit the movement of the frame members 14a and 14b by allowing the second intermediate leg 18b to pass through it until the leg 18b abuts therewith.

The cartridge 10 is actuated by squeezing the finger gripping legs 16a and 16b together with a force sufficient to overcome the resistance offered by the spring 22. When the legs 16a and 16b are moved closer together, the second intermediate leg 18b simultaneously slides over the first intermediate leg 18a and the second slide gripping leg 20b is moved away from its corresponding leg 20a, i.e., from the position shown in solid lines in FIGURE 5 toward the position shown in phantom in FIGURE 5.

The extent of this separation, however, is directly related to the extent the finger gripping legs 16a and 16b move together. When these legs 16a and 16b are actuated, the second leg 16b moves toward the first leg 16a until it abuts against the edge of the plate 26 as shown in phantom in FIGURE 4. This limitation in the actuation of the cartridge 10 provides for stability in the frame members 14a and 14b—for if the finger gripping legs 16a and 16b were allowed to be squeezed together as far as the spring 22 would allow—the second finger gripping leg 16b would raise up and cause its intermediate leg 18b to pivot about the first intermediate leg 18a. As a result, the end portion of its slide gripping leg 20a would move toward the end portion of the second slide gripping leg 20b and thereby narrow the gap between the lower portion of the legs 20a and 20b to prevent the insertion of slides 12 therebetween.

When the cartridge 10 is actuated and the slide gripping legs 20a and 20b are separated, as shown in phantom in FIGURE 5, the slides 12 are inserted therebetween. The number of slides 12 that the cartridge 10 will grip and hold is directly related to their thickness. Specifically, their thickness must be no greater than the maximum separation of the legs 20a and 20b, and no less than the minimum separation of the legs 20a and 20b (see FIG. 5). If the slides 12 have a thickness greater than the maximum separation, they will not all fit into this space and if they have a thickness less than the minimum separation, they will fall out and not be held by the cartridge 10.

On the other hand, when a number of slides 12 having the optimum thickness, as described above, is placed between the actuated slide gripping legs 20a and 20b, as shown in phantom in FIGURE 5, they are gripped and held when the finger gripping legs 16a and 16b are released as shown by the solid lines in FIGURE 5. The release of these legs 16a and 16b causes the spring 22 to force the second leg 16b away from the first leg 16a until the first and second slide gripping legs 20a and 20b abut against the slides 12. Once the slides 12 are gripped by the legs 20a and 20b, the slides are resiliently held by the cartridge 10 under the control of the spring 22.

To release the slides 12 into a suitable slide feeding mechanism in a viewing projector, for example, the cartridge 10 containing the slides 12 is placed over such mechanism and the cartridge 10 actuated as heretofore described. This causes the slide gripping legs 20a and 20b to separate and the slides 12 to fall by the force of gravity into the slide feeding mechanism.

Another embodiment of the present invention is illustrated in FIGURE 6 and is generally identified by reference numeral 110. The cartridge 110 functions identically to cartridge 10 and embodies the same structure, with the exception that a different biasing arrangement and support arrangement is substituted in cartridge 110 for the spring 26 and bracket 28 of cartridge 10.

As shown in FIGURE 6, the cartridge 110 includes a pair of stepped frame members 114a and 114b, identical in construction to frame members 14a and 14b described above. In contrast to the cartridge 10, the cartridge 110 embodies a block 126 which is seated on a pair of spacers 132a and 132b, which in turn are seated on the first intermediate leg 118a. The block 126 and the spacers 132a and 132b are suitably secured thereto by fasteners 136. Similar to the bracket 26 of cartridge 10, the block 126 and the spacers 132a and 132b provide a guiding means for the second intermediate leg 118b during its movement relative to the leg 118a when the cartridge 110 is actuated.

Similar to the bracket 26, the block 126 supports the resilient biasing means for the cartridge 110. To this end, there is provided a pair of resilient plungers 138a and 138b which co-act with the finger gripping leg 116b. Specifically, a pair of bores 140a and 140b extend transversely into the block 126 to accommodate a pair of springs 122a and 122b and the pair of plungers 138a and 138b. Similar to the spring 22, the plungers 138a and 138b, biased by the coil springs 122a and 122b, urge the finger gripping legs 116a and 116b apart and, thereby, urge the slide gripping legs 120a and 120b together.

Although the present embodiment of this invention is fabricated from metal, any other suitable material could be used.

While the embodiments described herein are at present considered to be preferred, it is understood that various modifications and improvements may be made therein, and it is intended to cover in the appended claims all such modifications and improvements as fall within the spirit and scope of the invention.

I claim:

1. A photographic slide cartridge for storing a plurality of photographic slides and for selectively discharging the slides into a suitable slide-feeding mechanism; which cartridge comprises a first and a second step-shaped frame member each having a finger gripping leg, an intermediate leg and a slide gripping leg that is engageable with the slides when confined within the cartridge; said first frame member being apertured to receive said intermediate leg of said second frame member so that said intermediate leg of said second frame member is slidably superimposed over said intermediate leg of said first frame member and so that said frame members have a generally H-shaped side configuration; a housing secured to said intermediate leg of said first frame member; said housing defining a passage for receiving said intermediate leg of said second frame member so that said intermediate legs of said frame members are maintained in slidably superimposed relation; and biasing means connected to said housing and coacting with said frame members so that said slide-gripping legs are biased toward each other and impart a gripping force to the slides situated therebetween; said slide-gripping legs being moved apart against the resilient action of said biasing means in response to said finger gripping legs being urged together and in response to the resultant sliding movement of said intermediate leg of said second frame member through said passage and through the apertured portion of said first frame member.

2. A slide cartridge as defined in claim 1 wherein said biasing means is a plunger and spring arrangement provided in said housing and bearing against said finger gripping leg of said second frame member.

3. A photographic slide cartridge for storing a plurality of photographic slides and for selectively discharging the slides into a suitable slide-feeding mechanism; which cartridge comprises a first and a second step-shaped frame member each having a finger gripping leg, an intermediate leg and a slide gripping leg that is engageable with the slides when confined within the cartridge; said first frame member being apertured to receive said intermediate leg of said second frame member so that said intermediate leg of said second frame member is slidably superimposed over said intermediate leg of said first frame member and so that said frame members have a generally H-shaped side configuration; a housing secured to said intermediate leg of said first frame member; said housing defining a passage for receiving said intermediate leg of said second frame member so that said intermediate legs of said frame members are maintained in slidably superimposed relation; and biasing means connected to said housing and coacting with said frame members so that said slide-gripping legs are biased toward each other and impart a gripping force to the slides situated therebetween; said slide-gripping legs being moved apart against the resilient action of said biasing means in response to said finger gripping legs being urged together and in response to the resultant sliding movement of said intermediate leg of said second frame member through said passage and through the apertured portion of said first frame member; said intermediate leg and said slide gripping leg of said second frame member being offset at the juncture thereof to preclude the slides from moving between the said intermediate leg of said first frame member and the slide gripping leg of said second frame member when said cartridge is selectively actuated.

4. A slide cartridge as defined in claim 3 wherein said biasing means is a plunger and spring arrangement provided in said housing and bearing against said finger gripping leg of said second frame member.

References Cited in the file of this patent

UNITED STATES PATENTS

| | | |
|---|---|---|
| 461,998 | Coombs | Oct. 27, 1891 |
| 785,432 | Perkins | Mar. 21, 1905 |
| 1,556,579 | Baltzley | Oct. 13, 1925 |
| 2,074,643 | Domenego | Mar. 23, 1937 |
| 2,604,680 | Brack | July 29, 1952 |
| 2,698,765 | Eagle | Jan. 4, 1955 |
| 2,820,270 | Scott | Jan. 21, 1958 |